United States Patent Office 2,720,050
Patented Oct. 11, 1955

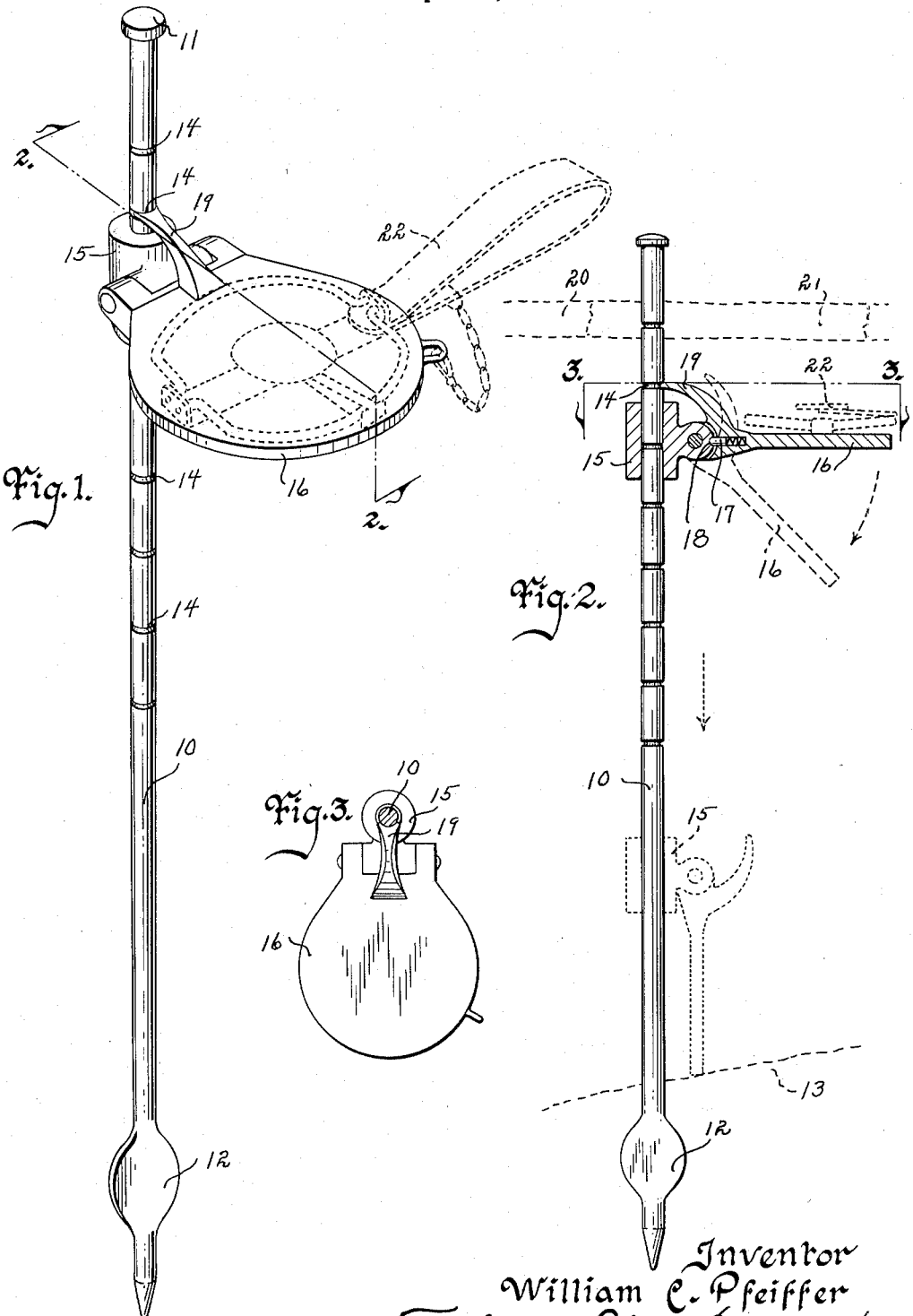

2,720,050

UNDER WATER ANIMAL TRAP SUPPORT

William C. Pfeiffer, Coon Rapids, Iowa

Application April 2, 1952, Serial No. 280,118

3 Claims. (Cl. 43—96)

This invention relates to trap supports for use under water and particularly to supports that hold the set trap below the horizontal plane of any ice that may exist in the water in which the device is used.

The placement of animal traps under water for catching certain fur bearing animals is universally practical. The difficulty, however, is that the animal is not killed and may well get free of the trap before the trapper arrives.

Therefore, the principal object of my invention is to provide a trap support that is trippable after the catch whereby the trap and caught animal will drop to the bottom of the water area and the animal will be drowned.

A further object of this invention is to provide an under water trap support that may be easily installed for use.

A still further object of this device is to provide a trap support that is a self marker as to the location of the trap.

A still further object of my device is to provide an under water trap support that may be easily retrieved with the trap and possible caught animal by the trapper.

A still further object of my invention is to provide an animal trap support for under water trapping that is economical in manufacture and durable in use.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my trap support in elevated condition and with a set trap thereon shown in broken lines.

Fig. 2 is a side view of the invention with parts cut away to more fully illustrate its construction and with broken lines showing the manner of tripping the platform and its movement, Fig. 3 is a top plan view of the platform in cocked condition and is taken on line 3—3 of Fig. 2.

Referring to the drawings in detail, I have used the numeral 10 to designate a post rod or stake having a head 11 at its top and a flat spade portion 12 near its lower end. The extreme lower end of the rod 10 is sharpened and this end and the flattened portion 12 are pushed or driven into the lake bed 13 as shown in Fig. 2. This flattened portion 12 not only aids in holding the rod post in a vertical position, but eliminates any turning movement after being installed. The numeral 14 designates a plurality of spaced apart continuous grooves in the upper length portion of the rod. The numeral 15 designates a bearing member slidably and rotatably mounted on the rod post 10. The numeral 16 designates a platform hinged at one side to the bearing member 15 as shown in Fig. 1. The numeral 17 designates a spring loaded latch on the platform 16 and yieldingly engaging a notch 18 in the bearing member as shown in Fig. 2 for normally holding the platform in a horizontal condition. The numeral 19 designates a trigger finger rigidly fixed on the platform for selectively engaging one of the grooves 14.

To use my device I place the lower end of the rod post in the lake bed with its upper end above the water surface. This upper end, therefore, provides an easily observed marker as to the exact location of the device. In case of ice 20 over the water, I cut therein a hole 21 and the post rod is inserted through the same and into the ground at the bottom of the water. Obviously the distance below the water surface or air space in the ice to the platform will depend on circumstances, the game to be caught, or the fancy of the trapper. This vertical adjustment may be readily obtained by sliding the bearing member to the proper height and lifting the platform to the horizontal where its trigger finger will enter and engage the adjacent continuous circular groove 14. In bringing this platform 16 to a horizontal position, two things are accomplished, i. e., the spring loaded slidable bar latch 17 enters the holding notch 18, and the trigger finger 19 enters the selected groove 14. The latch 17 will yieldingly hold the platform in a horizontal condition relative to the sleeve bearing 15 and the finger 19 will hold the bearing member 15 from sliding downwardly on the rod post 10. The upper free end of the trigger may be concave to conform to and with the convex patch of the groove it is engaging. By the grooves 14 being continuous around the rod post, the bearing member, its platform and parts may freely rotate around the rod post even when the platform is in cocked condition. If the water in which the device is installed is moving the platform may "weather vane" with the current. Once my device is installed a set animal trap 22 is placed on the platform and its chain fastened to the platform as shown in Fig. 1. The trap will be below the ice and I recommend below the air hole 21 as shown in Fig. 2. Many fur bearing animals swim under water and under the ice thereon for short periods of time. An air hole in the ice is an invitation to investigate and get a breath of needed air. My platform is an ideal support for the animal to rest on with its nose out of water and this is true even when no ice covers the water area. Obviously the animal will spring the trap and get caught. The first reaction of the animal will be to jump off the platform with the trap, pulling the platform downwardly, as shown by broken lines in Fig. 2. With the platform lowered on its hinges, the finger will be removed from the holding groove 14 and the bearing member, platform, and mechanism will slide downwardly on the post rod to the water bottom. The animal cannot then reach the water surface and will drown, assuring the trapper of a sure catch. When the trapper arrives to retrieve the catch, he has merely to lift the entire device upwardly by grasping the top portion of the rod post. The bearing member 15, platform, trap and animal are secure as the portion 12 prevents the bearing member from sliding downwardly off the rod post.

The spring catch 17 and holding notch 18 are of such yielding strength as to not be tripped by merely the weight of the animal when it first mounts the platform and before being caught. The struggles of the animal to free itself after being caught, however, will be of sufficient violence as to trip the platform.

Some changes may be made in the construction and arrangement of my under water animal trap support without departing from the real spirit and purpose of my invention, and it is my intention to cover by my claims, any modified forms of structure or use of mechanical equivalents which may be reasonably included within their scope.

I claim:

1. In combination with an animal trap, a trap support comprising, a post member, a bearing member slidably mounted on said post, a platform hinged to said bearing member, a means for yieldingly latching said platform in a horizontal position relative to said bearing member, a trigger means secured to the top of said platform and for releasably holding said bearing member in an elevated position on said post, and a means for securing said trap to said platform.

2. In a device of the class described, a post having a plurality of spaced apart continuous concave grooves formed therein about its circumference, a bearing member rotatably and slidably mounted on said post, a platform hinged to said bearing member, a trigger finger secured to and extending above the top of said platform and for selectively entering one of said grooves above said platform when said platform is in a horizontal position, and a yieldable latch means for releasably holding said platform in a horizontal position.

3. In an animal trap support, a post, a bearing embracing and vertically slidable on said post, a platform hingedly secured to said bearing and adapted to receive an animal trap thereon; said post having at least one groove therein near its top, a trigger finger secured to and extending above the top of said platform and extending into said groove when said platform is in a horizontal position and said bearing is below said groove, and means for yieldingly holding said platform in a horizontal position; said yielding means being adapted to permit hinging movement of said platform when a predetermined force is applied thereto.

References Cited in the file of this patent

UNITED STATES PATENTS

| 357,650 | Zeller | Feb. 15, 1887 |
| 486,981 | Gruenhagen | Nov. 29, 1892 |
| 635,542 | Hayne | Oct. 24, 1899 |
| 898,023 | Wheeler | Sept. 8, 1908 |
| 1,083,086 | Green | Dec. 30, 1913 |
| 1,309,036 | Knight | July 8, 1919 |
| 1,858,713 | Martin | May 17, 1932 |
| 2,140,612 | Zeman | Dec. 20, 1938 |
| 2,527,629 | Free | Oct. 31, 1950 |

FOREIGN PATENTS

| 5,942 | Great Britain | Apr. 20, 1915 |